(12) United States Patent
Fujioka

(10) Patent No.: US 8,511,266 B2  
(45) Date of Patent: Aug. 20, 2013

(54) VALVE CONTROL APPARATUS FOR INTERNAL COMBUSTION ENGINE

(75) Inventor: Yukihiro Fujioka, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 83 days.

(21) Appl. No.: 12/866,902

(22) PCT Filed: Feb. 19, 2009

(86) PCT No.: PCT/IB2009/000304  
§ 371 (c)(1),  
(2), (4) Date: Aug. 10, 2010

(87) PCT Pub. No.: WO2009/106950  
PCT Pub. Date: Sep. 3, 2009

(65) Prior Publication Data  
US 2010/0313837 A1    Dec. 16, 2010

(30) Foreign Application Priority Data

Feb. 29, 2008    (JP) ................................. 2008-049383  
Dec. 11, 2008    (JP) ................................. 2008-316110

(51) Int. Cl.  
*F01L 1/34*    (2006.01)

(52) U.S. Cl.  
USPC .................... 123/90.15; 123/321; 123/345

(58) Field of Classification Search  
USPC ............. 123/90.15, 90.16, 90.17, 90.31, 321, 123/322, 345–348  
See application file for complete search history.

(56) References Cited

U.S. PATENT DOCUMENTS

| | | | |
|---|---|---|---|
| 6,006,706 A | 12/1999 | Kanzaki | |
| 6,516,759 B2 * | 2/2003 | Takahashi et al. | 123/90.15 |
| 7,191,746 B2 * | 3/2007 | Nakamura | 123/179.3 |
| 7,481,199 B2 * | 1/2009 | Nakamura | 123/345 |
| 7,703,424 B2 * | 4/2010 | Nakamura et al. | 123/90.16 |
| 7,779,796 B2 * | 8/2010 | Nakamura | 123/90.15 |
| 2002/0100440 A1 * | 8/2002 | Takahashi et al. | 123/90.15 |
| 2003/0101952 A1 * | 6/2003 | Uehara et al. | 123/90.16 |
| 2006/0213468 A1 | 9/2006 | Kawasaki et al. | |
| 2007/0017480 A1 | 1/2007 | Kondo | |

FOREIGN PATENT DOCUMENTS

| | | |
|---|---|---|
| EP | 1 630 365 A1 | 3/2006 |
| JP | 7-233713 | 9/1995 |
| JP | 7233713 A | 9/1995 |
| JP | 9-195738 | 7/1997 |
| JP | 2001-289086 | 10/2001 |

(Continued)

*Primary Examiner* — John T. Kwon  
(74) *Attorney, Agent, or Firm* — Drinker Biddle & Reath LLP

(57) ABSTRACT

A valve control apparatus is provided for an internal combustion engine. The apparatus includes a variable phase angle mechanism configured to continuously change a valve opening phase angle of a valve, a variable valve mechanism configured to continuously change at least one of a valve opening duration and a valve lift of the valve, and a controller configured to control the variable phase angle mechanism and the variable valve mechanism. The variable phase angle mechanism is configured to set the valve opening phase angle at a retarded phase angle in a startup operation as compared with a normal phase angle in a normal operation. After an engine stop command is generated, the controller controls the variable valve mechanism such that an integrated valve opening value is increased to be larger than an idle state integrated valve opening value in an idle state.

20 Claims, 10 Drawing Sheets

(56) References Cited

FOREIGN PATENT DOCUMENTS

| | | |
|---|---|---|
| JP | 2001-289086 A | 10/2001 |
| JP | 2006-220154 | 8/2006 |
| JP | 2006-266200 | 10/2006 |
| JP | 2006-266200 A | 10/2006 |
| JP | 2006-312943 | 11/2006 |

* cited by examiner

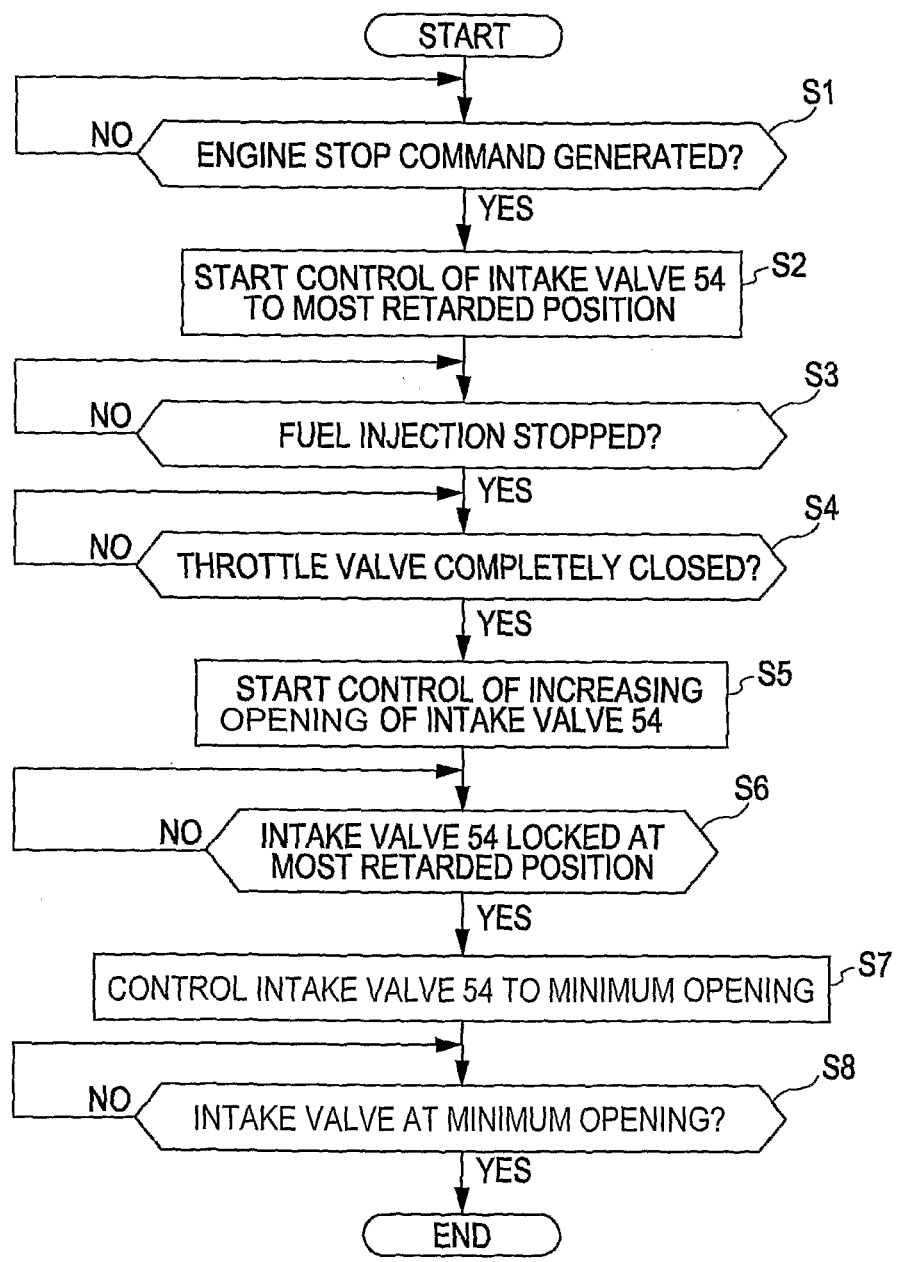

VALVE CONTROL APPARATUS FOR INTERNAL COMBUSTION ENGINE

CROSS-REFERENCE TO RELATED APPLICATIONS

This application claims priority to Japanese Patent Application No. 2008-316110 filed Dec. 11, 2008, and Japanese Patent Application No. 2008-049383 filed Feb. 29, 2008, each of which is incorporated by reference herein in its entirety.

BACKGROUND OF THE INVENTION

1. Field of the Invention

The present invention relates to an apparatus for controlling an internal combustion engine stop operation to enable good startup performance of the engine, wherein the engine includes a valve and a mechanism for controlling the valve opening center phase angle, the valve opening duration, and the valve lift of the valve.

2. Description of the Related Art

Japanese Unexamined Patent Application Publication No. 2006-312943 discloses an internal combustion engine including a variable phase angle mechanism (variable valve timing mechanism) capable of continuously changing a valve opening center phase angle (valve timing) of an intake valve, and a variable valve mechanism (variable lift mechanism) capable of continuously changing a valve opening duration and a valve lift of the intake valve.

SUMMARY OF THE INVENTION

An object of the present invention is to provide a valve control apparatus for an internal combustion engine, the apparatus being capable of moving a valve to a retarded position in a short time and reliably setting the valve at a valve opening phase angle for a startup operation during an operation period after an engine stop command is received or after operation of the engine is stopped.

In one embodiment of the present invention, a valve control apparatus for an internal combustion engine is provided. The apparatus includes a variable phase angle mechanism configured to continuously change a valve opening phase angle of a valve, a variable valve mechanism configured to continuously change at least one of a valve opening duration and a valve lift of the valve, and a controller configured to control the variable phase angle mechanism and the variable valve mechanism. The variable phase angle mechanism is configured to set the valve opening phase angle at a retarded phase angle in a startup operation as compared with a normal phase angle in a normal operation. After an engine stop command is generated, the controller controls the variable valve mechanism such that an integrated valve opening value is increased to be larger than an idle state integrated valve opening value in an idle state.

In another embodiment of the present invention, a method for controlling a valve in an internal combustion engine is provided. The method includes determining an idle state integrated valve opening value by integrating the area under a curve plotting a valve lift of the valve on the vertical axis and a valve opening duration of the valve on the horizontal axis when the engine is operating in an idle state. The method further includes, after an engine stop command is generated, determining a current integrated valve opening value by integrating the area under a curve plotting a valve lift of the valve on the vertical axis and a valve opening duration of the valve on the horizontal axis, and controlling at least one of the valve lift and the valve opening duration of the valve such that the current integrated value is increased to be larger than the idle state integrated valve opening value.

In another embodiment of the present invention, a valve control apparatus is provided for an internal combustion engine. The apparatus includes variable phase angle means configured to continuously change a valve opening phase angle of a valve, variable valve means configured to continuously change at least one of a valve opening duration and a valve lift of the valve, and control means configured to control the variable phase angle means and the variable valve means. The variable phase angle means is configured to set the valve opening phase angle at a retarded phase angle in a startup operation as compared with a normal phase angle in a normal operation. After an engine stop command is generated, the variable valve means changes at least one of the valve opening duration and the valve lift of the valve to increase an integrated valve opening value to be increased to be larger than an idle state integrated valve opening value in an idle state.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 5 is a flowchart according to a first embodiment;

DESCRIPTION OF THE PREFERRED EMBODIMENTS

Embodiments of the present invention will be described in detail below with reference to the accompanying drawings.

First Embodiment

Figure 1:
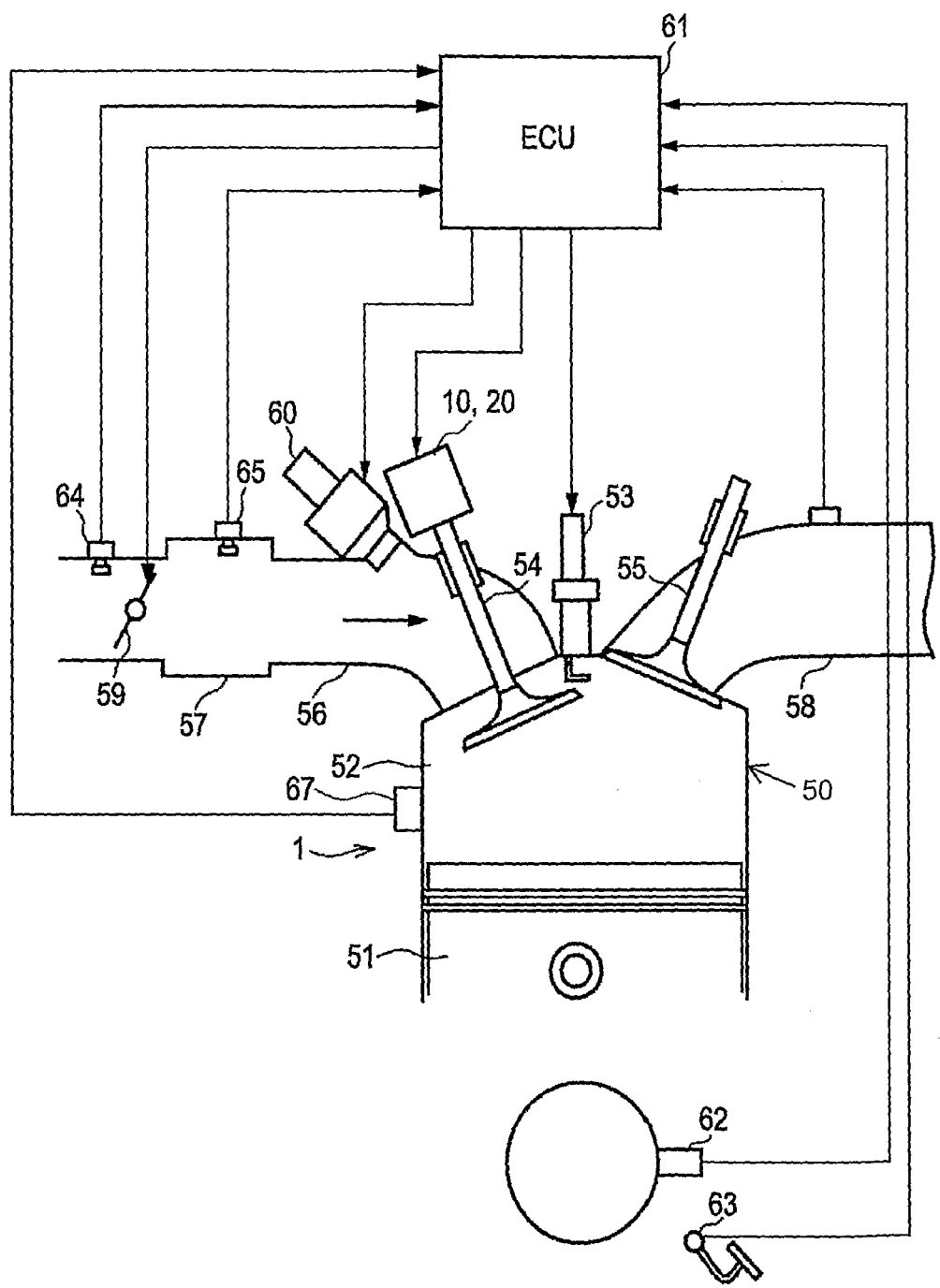
FIG. 1 illustrates a configuration of an internal combustion engine according to an embodiment of the present invention.

FIG. 1 is a configuration diagram showing an internal combustion engine 1. As depicted, only one cylinder 50 of the engine 1 is shown, it being understood that the engine 1 can have any number of cylinders 50. The engine 1 includes a combustion chamber 52. The combustion chamber 52 is defined by a piston 51 within the cylinder 50 of the engine 1. The piston 51 reciprocates in the cylinder 50 in accordance with the rotation of an engine crankshaft (not shown). The combustion chamber 52 includes an intake valve 54 and an exhaust valve 55 which are arranged in proximity to an ignition plug 53. Intake gas passes through an intake channel 56, then through the intake valve 54, and is sucked into the combustion chamber 52 during an intake stroke of the piston 51. An intake manifold 57 is disposed at an intermediate portion of the intake channel 56. Exhaust gas from the combustion chamber 52 passes through the exhaust valve 55 during an exhaust stroke of the piston 51, then through an exhaust channel 58, and is discharged to the outside.

The intake valve 54 is controlled by a variable operating characteristic mechanism that varies valve operating characteristics of the intake valve 54. The variable operating characteristic mechanism includes a variable valve mechanism 10 that continuously changes a valve opening duration and a valve lift of the intake valve 54, and a variable phase angle mechanism 20 that continuously changes a center phase angle of the valve opening of the intake valve 54. In this embodiment, the exhaust valve 55 has fixed valve characteristics. Alternatively, the exhaust valve 55 may have variable valve characteristics controlled by a variable operating characteristic mechanism similar to that described herein with regard to the intake valve 54.

In the intake channel 56, an electric-control throttle valve 59 is provided upstream of the manifold 57. The electric-control throttle valve 59 has a throttle mechanism including an intake throttle valve and an actuator that drives the intake throttle valve. In the intake channel 56, an electromagnetic fuel injection valve 60 is provided at an intake port portion of every cylinder.

An electronic control unit (ECU) 61 controls the operations of the ignition plug 53, the variable valve mechanism 10, the variable phase angle mechanism 20, the electric-control throttle valve 59, and the fuel injection valve 60.

The ECU 61 receives signals from various sensors. Such sensors include a crank angle sensor 62 that detects a crank angle position θ and an engine speed $N_e$ by outputting a crank angle signal in synchronization with engine revolution, an accelerator pedal sensor 63 that detects an accelerator pedal opening (i.e., the degree of accelerator pedal depression degree), a hot-wire air flow meter 64 that measures an air flow rate flowing into the manifold 57 at a position located upstream of the throttle valve 59 of the intake channel 56, an intake gas temperature sensor 65 that detects an intake gas temperature in the manifold 57, a water temperature sensor 67 that detects an engine water temperature, a valve opening sensor 32 (described below) that detects a valve opening of the intake valve 54, and a center phase angle sensor 31 that detects a valve opening center phase angle of the valve opening of the intake valve 54.

A fuel injection timing and a fuel injection amount of the fuel injection valve 60 are controlled in accordance with an engine operating condition. The fuel injection amount is controlled to achieve a desired air-fuel ratio with respect to a controlled cylinder intake air amount.

An ignition timing by the ignition plug 53 is controlled to a minimum advance for best torque (MBT) or a knock limit in accordance with the engine operating condition.

Figure 2:
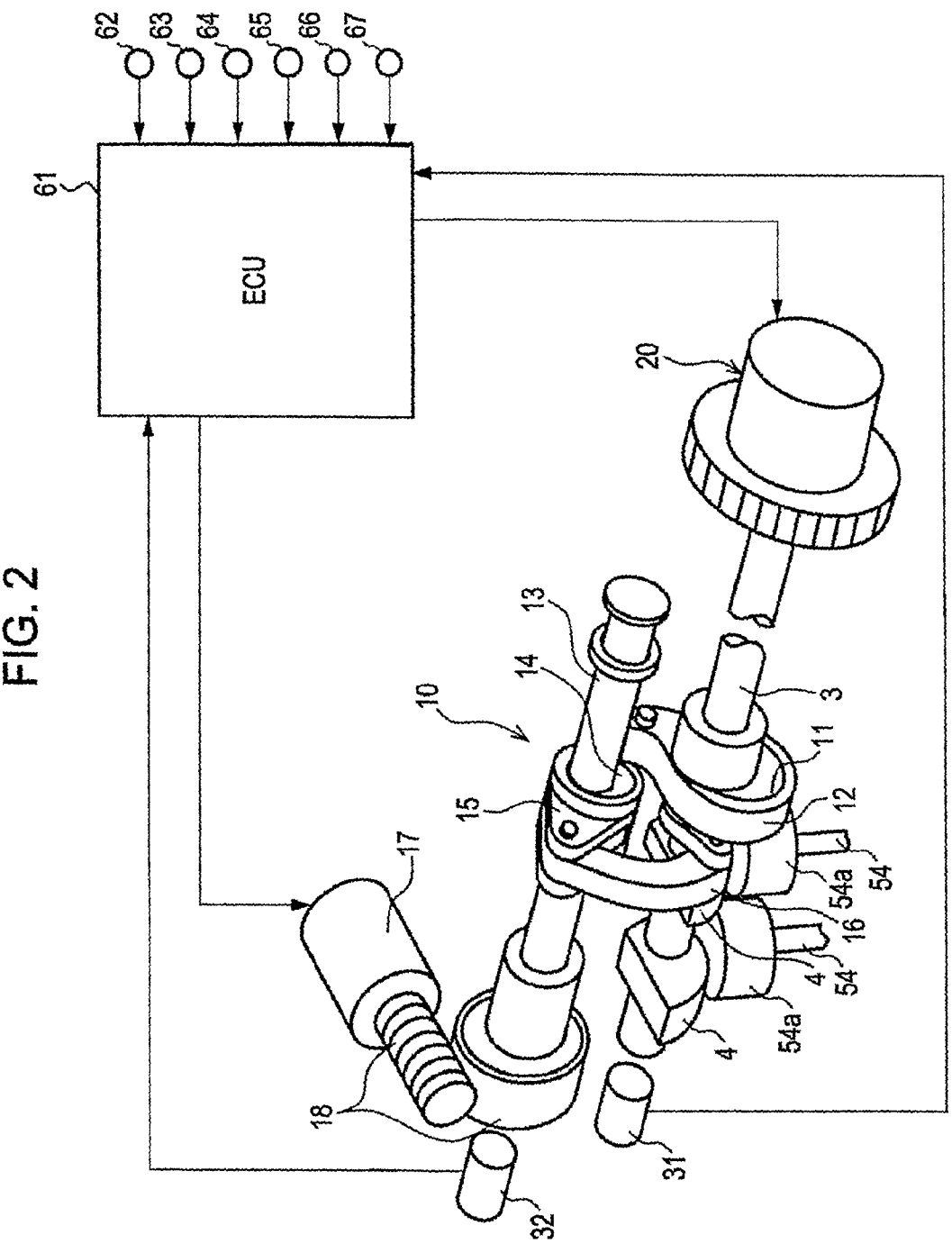
FIG. 2 is a perspective view showing a variable valve mechanism of the engine.

FIG. 2 illustrates the above-described variable valve mechanism 10. As depicted, a pair of intake valves 54 are provided for every cylinder. A hollow intake drive shaft 3 is arranged above the intake valves 54 and extends in a direction corresponding to the alignment of cylinders in the engine. Rocker cams 4 are rotatably fitted on the intake drive shaft 3 so that the rocker cams 4 can rotate with respect to the intake drive shaft 3. The rocker cams 4 contact valve lifters 54a of the respective intake valves 54, and open and close the intake valves 54.

The electric variable valve mechanism 10 is provided between the intake drive shaft 3 and the rocker cam 4. The variable valve mechanism 10 continuously changes the valve opening duration and the valve lift of the intake valve 54.

Also, the hydraulic variable phase angle mechanism 20 is provided at an end portion of the intake drive shaft 3. The variable phase angle mechanism 20 continuously changes the intake center phase angle of the intake valves 54, which is a center phase angle of the intake valve opening.

Figure 3:
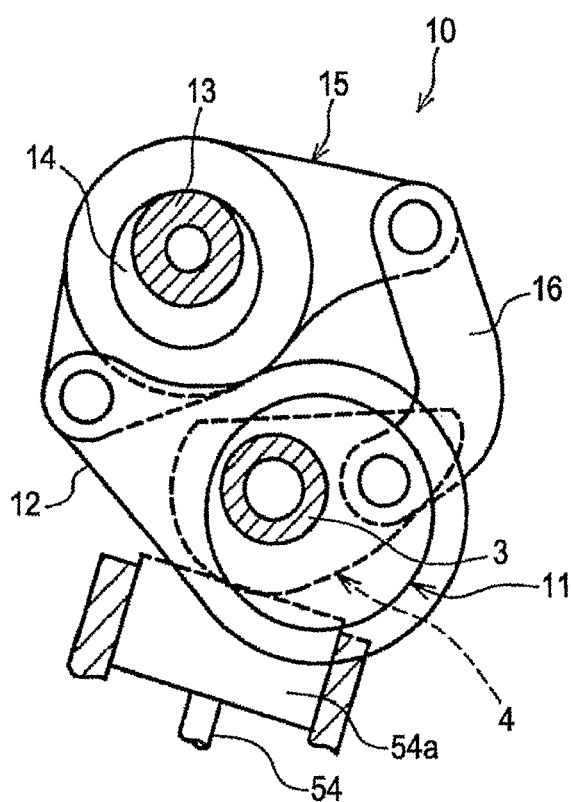
FIG. 3 is an enlarged side view partly showing the variable valve mechanism of FIG. 2.

Referring to FIGS. 2 and 3, the variable valve mechanism 10 includes a circular drive cam 11 eccentrically fixed to the intake drive shaft 3, a ring-like link 12 rotatably fitted on the drive cam 11 so that the ring-like link 12 can rotate with respect to the drive cam 11, a control shaft 13 extending in the direction aligned with the cylinders of the engine and substantially in parallel to the intake drive shaft 3, a circular control cam 14 eccentrically fixed to the control shaft 13, a rocker arm 15 rotatably fitted on the control cam 14 so that the rocker arm 15 can rotate with respect to the control cam 14, an end of the rocker arm 15 being coupled to a tip end of the ring-like link 12, and a rod-like link 16 coupled to another end of the rocker arm 15 and to the rocker cam 4. The control shaft 13 is rotationally driven by an electric actuator 17 via a gear train 18 within a predetermined control range.

With the above configuration, the intake drive shaft 3 is rotated in association with the crankshaft of the engine 1. The ring-like link 12 substantially follows the movement of the intake drive shaft 3 via the drive cam 11 rotated by the intake drive shaft 3, the rocker arm 15 is rocked around an axis of the control cam 14, and the rocker cam 4 is rocked via the rod-like link 16, thereby opening and closing the intake valve 54.

Also, when a rotation angle of the control shaft 13 is changed, an axis position of the control cam 14, the axis position serving as the rocking center of the rocker arm 15, is changed, and hence, the posture of the rocker cam 4 is changed. Accordingly, the intake valve opening duration and the valve lift are continuously changed while the intake center phase angle is substantially constant.

The valve opening sensor 32 is provided that detects the valve opening of the intake valve 54 by detecting the rotation angle of the control shaft 13. The valve opening is understood to be characterized by the integrated valve opening value as a function of both the valve opening duration and the valve lift.

Referring to FIG. 2, the center phase angle sensor 31 detects the valve opening center phase angle (valve timing) of the intake valve 54 by detecting the rotation phase angle of the intake drive shaft 3.

Figure 4A:
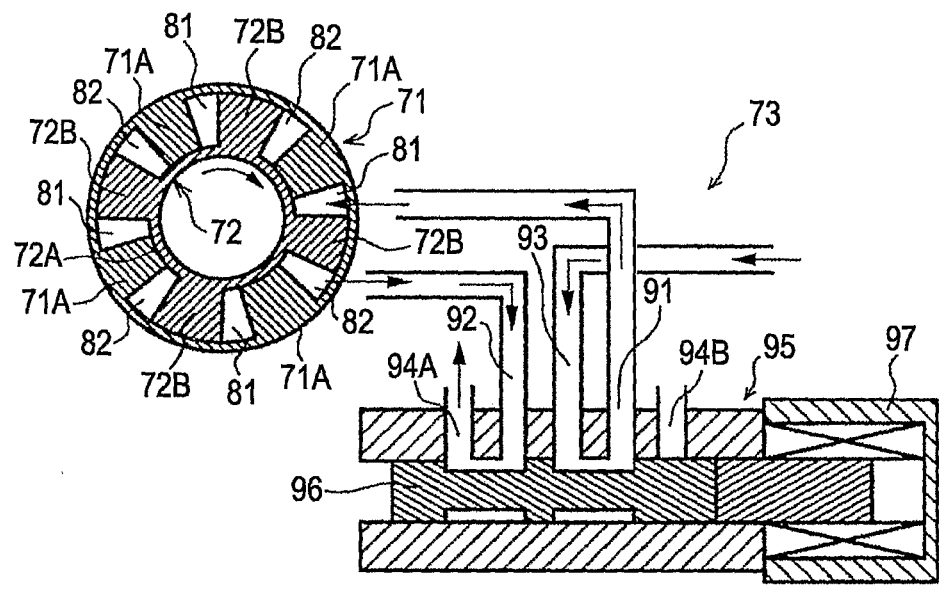
FIGS. 4A and 4B are cross-sectional views each showing a control state of a valve opening center phase angle performed by a variable phase angle mechanism according to an embodiment of the present invention.
Figure 4B:
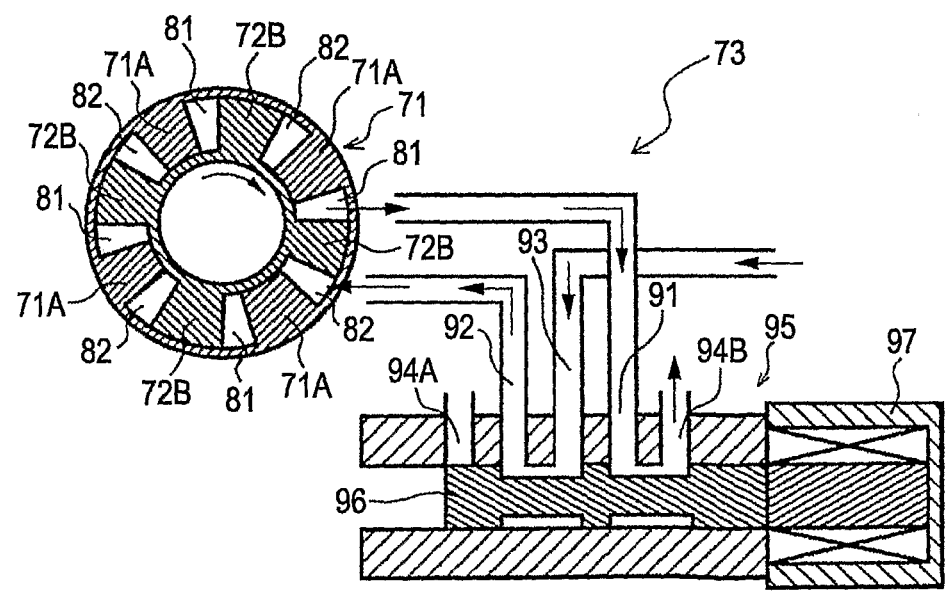

Referring to FIGS. 4A and 4B, the hydraulic variable phase angle mechanism 20 includes a cylindrical housing 71, a rotary member 72, and a hydraulic circuit 73. The housing 71 is a cam sprocket rotationally driven by the crankshaft of the engine (not shown) via a timing chain. The rotary member 72 is fixed to an end portion of the intake drive shaft 3 and is rotatably housed in the housing 71. The hydraulic circuit 73 causes the rotary member 72 to be rotated relative to the housing 71.

Four partition walls 71A protrude from the inner peripheral surface of the housing 71 at every 90 degrees and are arranged along an axial direction of the housing 71. The partition walls 71A each have a trapezoidal cross section.

The rotary member 72 is fixed to a front end portion of the intake drive shaft 3 and has a circular base portion 72A. Four vanes 72B arranged on the outer peripheral surface of the base portion 72A at every 90 degrees. The vanes 72B are arranged at recessed portions between the partition walls 71A of the housing 71. The vanes 72B divide the recessed portions into front and rear spaces in a rotation direction, so that advance hydraulic fluid chambers 81 and retard hydraulic fluid chambers 82 are disposed between both sides of the vanes 72B and both sides of the partition walls 71A.

The hydraulic circuit 73 includes two hydraulic fluid channels, a first hydraulic fluid channel 91 that feeds and removes a hydraulic pressure to and from the advance hydraulic fluid chambers 81, and a second hydraulic fluid channel 92 that feeds and removes a hydraulic pressure to and from the retard hydraulic fluid chambers 82. A supply channel 93 and drain channels 94A and 94B are connected to the hydraulic fluid channels 91 and 92 via a solenoid operated directional control valve 95 for channel switching. The supply channel 93 is connected to an oil pump driven by the engine that pumps oil in an oil pan. Also, downstream ends of the drain channels 94A and 94B are connected to the oil pan.

The solenoid operated directional control valve 95 has a spool valve body 96 therein. The spool valve body 96 controls switching of the supply channel 93 and the drain channels 94A and 94B with respect to the hydraulic fluid channels 91 and 92.

The ECU 61 controls an electricity to a solenoid 97 of the solenoid operated directional control valve 95.

For example, when the electricity to the solenoid 97 is increased, as shown in FIG. 4A, the hydraulic fluid passes through the first hydraulic fluid channel 91, and is supplied into the advance hydraulic fluid chambers 81. Also, the hydraulic fluid in the retard hydraulic fluid chambers 82 passes through the second hydraulic fluid channel 92, then through the drain channel 94A, and is discharged to the oil pan, resulting in the pressure of the retard hydraulic fluid chambers 82 being decreased. Hence, the rotary member 72 is rotated to an advanced side via the vanes 72B. Accordingly, a valve opening timing of the intake valve 54 is advanced with respect to the crank angle of the crankshaft.

In contrast, when the electricity to the solenoid 97 is decreased, as shown in FIG. 4B, the hydraulic fluid pumped by the oil pump passes through the second hydraulic fluid channel 92 and is supplied into the retard hydraulic fluid chambers 82, and the hydraulic fluid in the advance hydraulic fluid chambers 81 passes through the first hydraulic fluid channel 91, then through the drain channel 94B, and is discharged to the oil pan. Hence, the inner pressure of the retard hydraulic fluid chambers 82 is increased whereas the inner pressure of the advance hydraulic fluid chambers 81 is decreased, and the rotary member 72 is rotated to a retarded side via the vanes 72B. Accordingly, a valve opening timing of the intake valve 54 is retarded with respect to the crank angle of the crankshaft.

As described above, the engine 1 equipped with the variable valve mechanism 10 and the variable phase angle mechanism 20 for the intake valve 54 performs control, which is a feature of this embodiment of the present invention, during an engine stop operation to prepare the engine for the next startup operation.

In a startup operation, the variable phase angle mechanism 20 of the intake valve 54 typically sets the center phase angle of the intake valve 54 at a most retarded position, although the variable phase angle mechanism 20 may alternatively set the center phase angle at an advanced position with respect to the most retarded position. Regardless, the set position is located in a retard direction with respect to a normal center phase angle position in a normal operation. An advantage of setting the center phase angle of the intake valve at a retarded position for startup is to reduce discharging of unburned fuel and other pollutants in the startup operation by decreasing a valve overlap of the intake valve opening with an exhaust valve opening, and to prevent abnormal noise or damage from being generated as a result of the intake valve hitting a stopper.

Meanwhile, typically in the variable valve mechanism 10 of the intake valve 54, when fuel injection is stopped after an engine stop command, the valve opening duration is set at or near a minimum valve opening duration due to a reaction force by a valve spring. Thus, when the engine is operated, the valve opening is moved from a low valve opening in an idle state to a valve opening near a minimum valve opening in the startup operation.

In a situation in which the engine is stopped, when the variable phase angle mechanism 20 is configured to be driven using a hydraulic pump powered by the engine to move the valve opening center phase angle of the intake valve to a retarded position, if a large resistance is concurrently being applied to driving of the intake valve 54 by a cam (e.g., the rocker cam 4), the can resistance acts as a further large driving force in the retard direction in addition to the hydraulic driving force.

Therefore, the variable valve mechanism 10 of the intake valve 54 is provided to move the intake valve 54 with low valve opening duration and a low valve lift so that a small resistance is applied to driving of the intake valve 54 by the cam, thus avoiding the problem of a further large driving force from the cam when the valve opening center phase angle is driven in the retard direction.

In prior art systems, the engine continues to be operated for a certain period even after the engine stop command is generated so as to move the valve opening phase angle to the retarded side by maintaining hydraulic pressure to drive the variable phase angle mechanism. The movement to the most retarded position takes time, and hence, fuel consumption increases due to driving of the engine, and also a driver feels uncomfortable if the operation is continued for a long period even after a key is turned OFF.

In contrast, in the present invention, the resistance for driving of the valve can be increased to be larger than the resistance in the idle state. Accordingly, the valve opening phase angle of the valve can be immediately retarded to and set at a startup value for the startup operation.

In particular, in this embodiment, the valve opening center phase angle of the intake valve 54 for the startup operation is set at the most retarded position. As discussed above, the purposes are to maintain good exhaust purification performance for hydrocarbons, carbon monoxide, and the like, by decreasing valve overlap between the intake valves and the exhaust valves in the startup operation as much as possible, and to prevent abnormal noise from being generated as a result of the intake valve hitting a stopper, by providing a setting operation.

FIG. 5 is a flowchart according to a first embodiment. In step S1, it is determined whether or not an engine stop command is generated. If it is determined that the engine stop command is generated, the process goes to step S2, in which the variable phase angle mechanism 20 is driven to start control in which the valve opening center phase angle of the intake valve 54 is moved to the most retarded position. Meanwhile, another control routine executes an engine stop operation including a control for stopping fuel injection and a control for completely closing the throttle valve.

In step S3, it is determined whether or not the fuel injection has been stopped by the fuel injection stop control following the engine stop command. If it is determined that the fuel injection has been stopped, the process goes to step S4, in which it is determined whether or not the throttle valve has been completely closed (minimum opening) by the throttle valve close control of the electric-control throttle valve 59 following the engine stop command.

If it is determined that the throttle valve has been closed in step S4, that is, if it is determined that the engine stop operation (including the control for stopping the fuel injection and the control for completely closing the throttle valve) is completed, the process goes to step S5. In step S5, a valve lift profile of the intake valve 54 is changed by the variable phase angle mechanism 20 for a predetermined period.

The changed valve lift profile is set as follows. A single-cycle valve lift profile from a valve-open timing to a valve-close timing of the intake valve 54** is set by using an integrated valve opening value. As used herein, "integrated valve opening value" means that the area is calculated under a curve plotting valve lift on the vertical axis and crank angle on the horizontal axis.

More specifically, the integrated valve opening value of the valve lift profile is controlled to be larger than an integrated valve opening value of a valve lift profile in an idle state, i.e., an idle state integrated valve opening value.

This embodiment employs the variable valve mechanism 10 in which when the valve opening duration is increased, the valve lift is also increased correspondingly. Hence, the integrated valve opening value, in which the valve lift is integrated at very small crank angle increments, is increased as the valve opening duration is increased. Also, the integrated valve opening value is decreased as the valve opening duration is decreased. That is, by increasing the valve opening duration of the intake valve 54 as compared with the valve opening duration in the idle state, the integrated valve opening value of the valve lift profile becomes larger than the idle state integrated valve opening value.

In step S5, the variable valve mechanism 10 starts controlling the valve opening of the intake valve 54 to be increased to be larger than the valve opening in the idle state. (Note that the valve opening in the idle state may be larger than a valve opening in a startup operation.) The predetermined period for changing the variable phase angle mechanism 20 can be determined on the basis of a time necessary for moving the valve opening center phase angle to a certain position which can depend on the temperature of ambient air drawn into the engine or the temperature of the engine. For example, the predetermined period may be longer when the ambient temperature is lower or the engine temperature is lower.

In step S6, it is determined whether or not the valve opening center phase angle of the intake valve 54 has been moved to the most retarded position and has been set. If it is recognized that the valve opening center phase angle has been set at the most retarded position, the process goes to step S7, in which the variable valve mechanism 10 stops the control of increasing the valve opening of the intake valve 54 and then controls the valve opening to be decreased. For example, in this embodiment, the valve opening for the startup operation is the minimum valve opening, and thus control in step S7 is switched from increasing the valve opening to decreasing the valve opening to the minimum valve opening. Meanwhile, the valve opening being set at the most retarded position may be detected, for example, by the center phase angle sensor 31 when a signal detected by the center phase angle sensor 31 is present at the most retarded position for a predetermined period or longer.

In step S8, it is determined whether or not the valve opening of the intake valve 54 has been decreased to a predetermined valve opening. If YES in step S8, the process is ended, and the engine stop operation is completed. In this embodiment, it is determined whether or not the valve opening is decreased to the minimum valve opening. Alternatively, the determination may be based on a valve opening of the set position, or on whether the valve opening is moved to a valve opening in a next startup operation.

With such control, after the engine stop command is generated and the stop operation is performed, by increasing the valve opening of the intake valve 54, the speed at which the valve opening center phase angle of the intake valve 54 is moved to the most retarded position can be increased. Accordingly, the valve opening center phase angle can be reliably moved to and set at the most retarded position.

To be more specific, when the engine stop command is generated, the variable phase angle mechanism 20 is operated as shown in FIG. 4B. That is, while the hydraulic fluid in the advance hydraulic fluid chambers 81 is discharged, the hydraulic fluid pumped by the oil pump is supplied to the retard hydraulic fluid chambers 82. Since the engine is stopped, the hydraulic pressure supplied by the oil pump driven by the engine is decreased, and hence, the driving force that causes the movement to the retarded side is decreased.

Meanwhile, the driving resistance of the intake valve 54 acts in a direction in which the center phase angle of the intake valve 54 is retarded. Accordingly, when the driving resistance is large, the driving force in the retard direction is large. Thus, when the valve opening of the intake valve 54 is large, a sliding distance of the rocker cam 4 and the valve lifter 54*a* when the intake valve 54 is opened is large, and the valve lift of the intake valve 54 is large. Also, the integrated valve opening value is large, in which the valve lift of the intake valve 54 is integrated at very small crank angle increments on the basis of the graph for the valve lift profile with the horizontal axis plotting the crank angle and the vertical axis plotting the valve lift. As a result, the reaction force by the valve spring of the intake valve 54 is large, and a surface pressure applied to the valve lifter 54*a* is large. Hence, the driving resistance of the intake valve 54 is large.

On the other hand, when the valve opening of the intake valve 54 is small, a sliding distance of the rocker cam 4 and the valve lifter 54*a* when the intake valve 54 is opened is small, and the valve lift of the intake valve 54 is small. Also, the integrated valve opening value is small. As a result, the reaction force by the valve spring of the intake valve 54 is small, and a surface pressure applied to the valve lifter 54*a* is small. Hence, the driving resistance of the intake valve 54 is small.

Figure 9A:
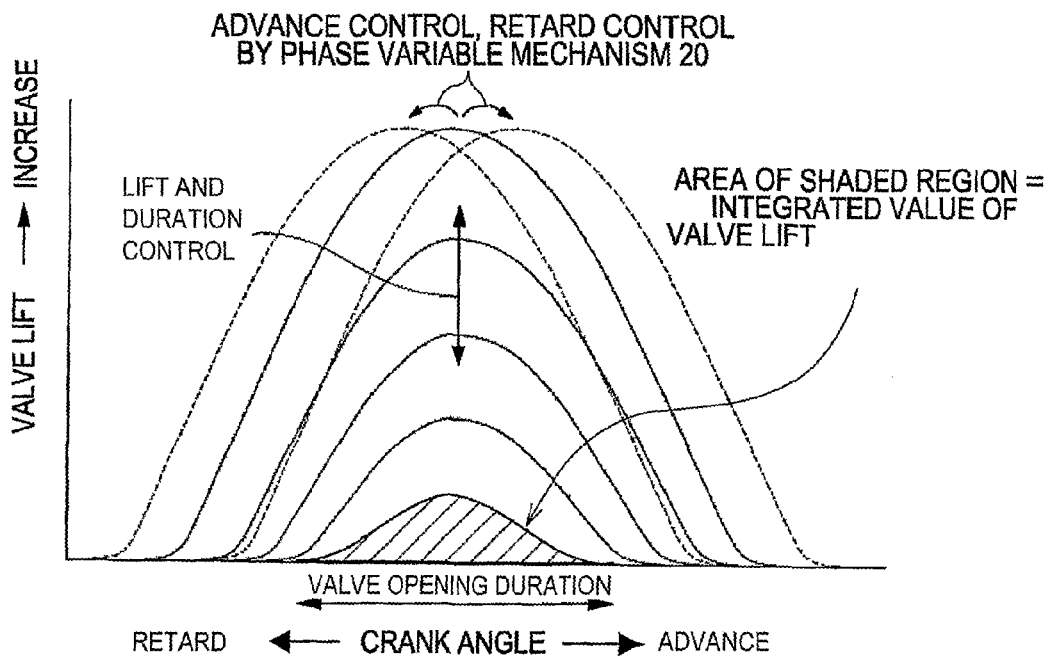
FIGS. 9A and 9B are explanatory views each showing an integrated valve opening value calculated by integrating valve lift (i.e., the area under a valve lift profile curve) at every very small crank angle increments.

FIG. 9A illustrates characteristics of the variable valve mechanism 10 according to this embodiment. The variable valve mechanism in this embodiment has a characteristic in which the valve lift is increased as the valve opening duration is increased. In the graph of FIG. 9A, the integrated valve opening value is an area beneath by a curve which represents the relationship between the crank angle and the valve lift, wherein the horizontal axis, which represents the crank angle and the valve opening duration extends from a valve opening timing to a valve closing timing, measured in crank angles.

Figure 9B:
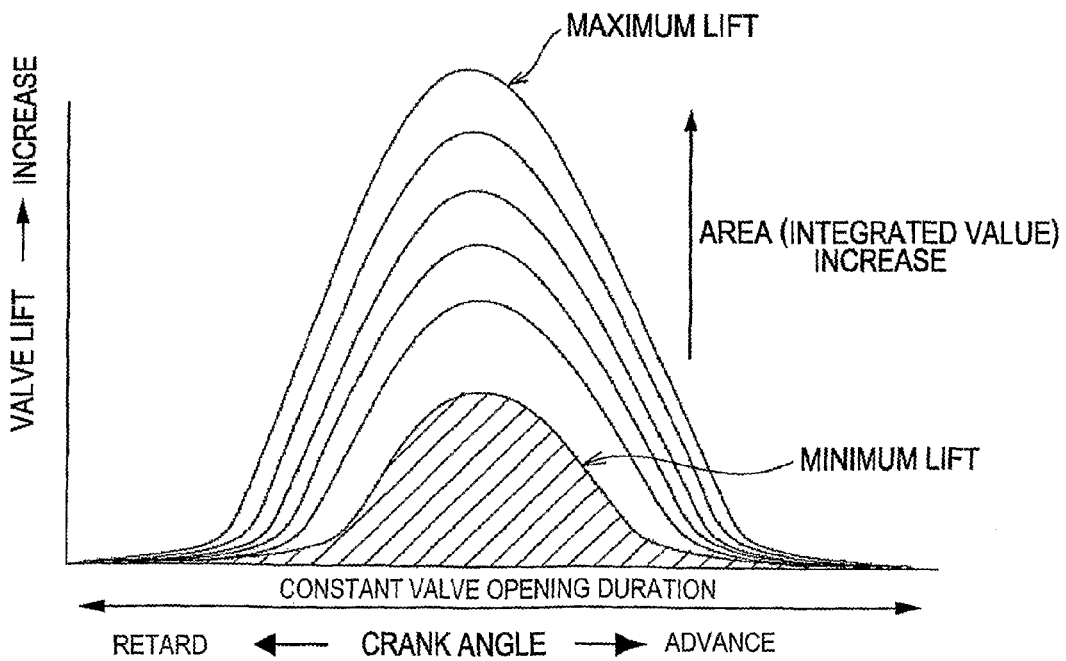

Even in an embodiment in which one of the valve opening duration and the valve lift is fixed, if the other one is increased, the integrated valve opening value is increased. Thus, in a variable valve mechanism, in which one of a valve opening duration and a valve lift is increased, as long as the integrated valve opening value is increased and hence the driving resistance to the intake valve 54 can be increased, an advantage similar to that of the above-described embodiment can be obtained. For example, FIG. 9B illustrates a characteristic of a variable valve mechanism in which the valve opening duration is constant and the valve lift is increased.

When the valve lift is increased, the area under the valve lift curve (i.e., the integrated valve opening value) is increased.

In prior systems, the valve opening before the engine stop operation is controlled to a relatively small valve opening in a period from when the valve opening of the intake valve 54 is the valve opening in the idle state to when the engine stop operation is completed. However, in this case, the driving resistance of the intake valve 54 is small and the driving force in the retard direction is small. Hence, in order to maintain a large driving force in the retard direction by the variable phase angle mechanism 20, it is necessary to delay the stop operation of engine combustion even after the engine stop command is generated so as to generate sufficient hydraulic pressure to operate the variable phase angle mechanism 20. By continuing the engine combustion after the engine stop command is generated, the driving force of the variable phase angle mechanism 20 in the retard direction is maintained, and the center phase angle is moved to and set at the most retarded position.

In the above-described embodiment disclosed herein, by increasing the valve opening of the intake valve 54 after the engine stop operation is completed, thereby increasing the driving resistance when the intake valve 54 is opened, the moving speed in the retard direction can be increased. Accordingly, it is not necessary to delay the engine stop operation for a long period so as to obtain the hydraulic pressure for controlling the variable phase angle mechanism 20 and setting the center phase angle of the intake valve 54. The center phase angle can be moved to and set at the most retarded position. Fuel consumption can be prevented from being increased, and a driver can be prevented from feeling uncomfortable as a result of the engine stop operation being delayed.

Also, since the control of increasing the valve opening of the intake valve 54 is started after the fuel injection is stopped and it is recognized that the throttle valve is completely closed, the engine speed can be prevented from being rapidly increased.

The intake valve 54 is set at the most retarded position for the startup operation, the valve opening is decreased to the minimum valve opening, and the engine stop operation is completed. Accordingly, start performance after the engine stop operation can be properly controlled, and exhaust purification performance can be properly maintained.

Figure 6:
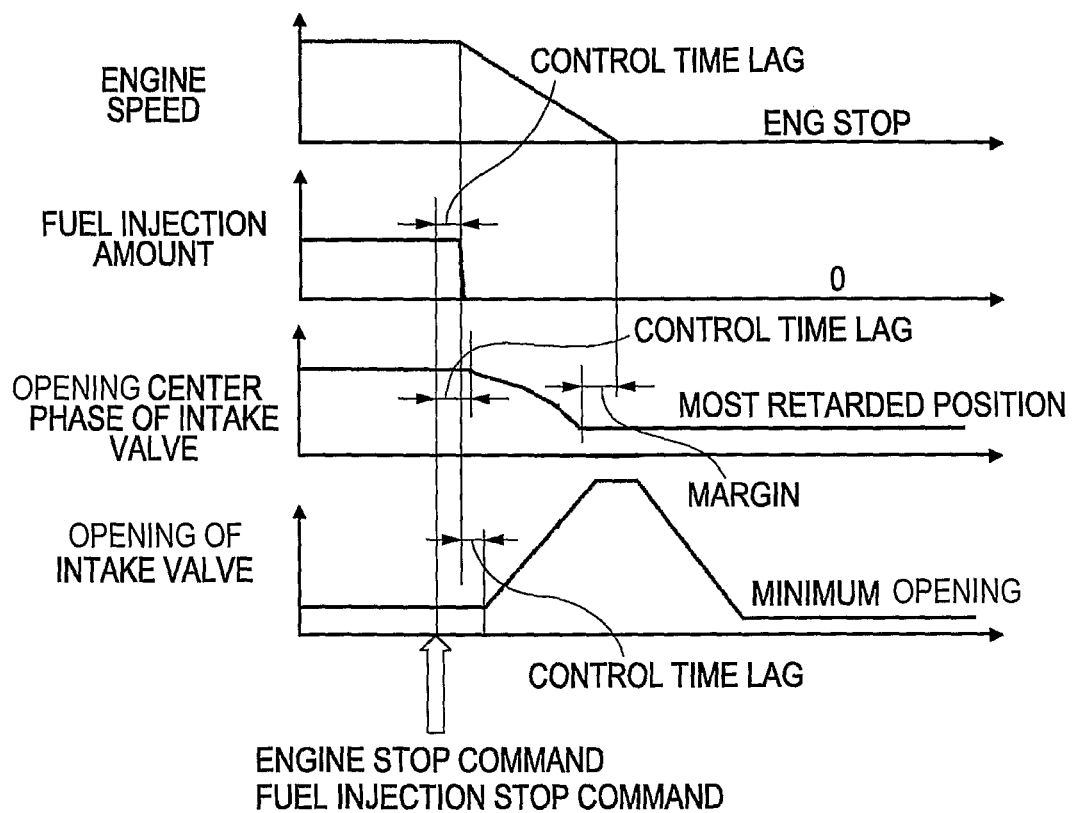
FIG. 6 is a time chart showing changes in various engine operating parameters according to the first embodiment.

FIG. 6 illustrates changes in various engine operating parameters according to the above-described embodiment, including an engine speed, a fuel injection amount, a valve opening center phase angle of the intake valve, and a valve opening duration of the intake valve.

In the above-described embodiment, while the control of increasing the valve opening is continued until it is recognized that the intake valve 54 is set at the most retarded position, a configuration may be employed in which the control is provided after estimating a valve opening or a valve opening increase period necessary for setting the intake valve 54 at the most retarded position.

After the engine stop command is generated, the control of retarding the center phase angle of the valve opening is started. Also, after the engine stop command is generated, the control of increasing the valve opening of the intake valve is started. Accordingly, the center phase angle of the valve opening can be set to the most retarded position before the engine speed becomes zero (i.e., the engine stop state).

Second Embodiment

Figure 7:
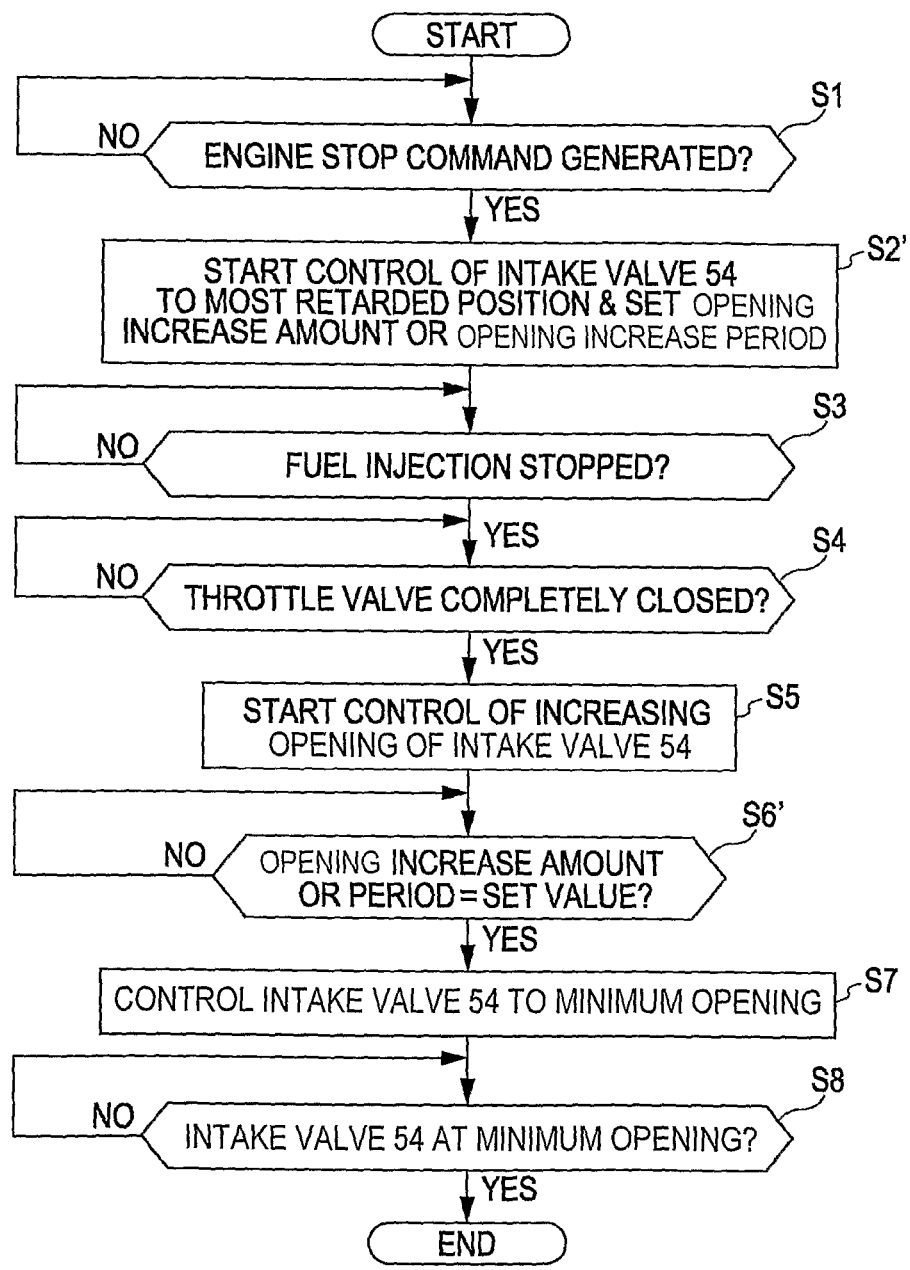
FIG. 7 is a flowchart according to a second embodiment.

FIG. 7 is a flowchart according to a second embodiment. Because aspects of the second embodiment are the same as the first embodiment, only the differences in the second embodiment are described.

Figure 10:
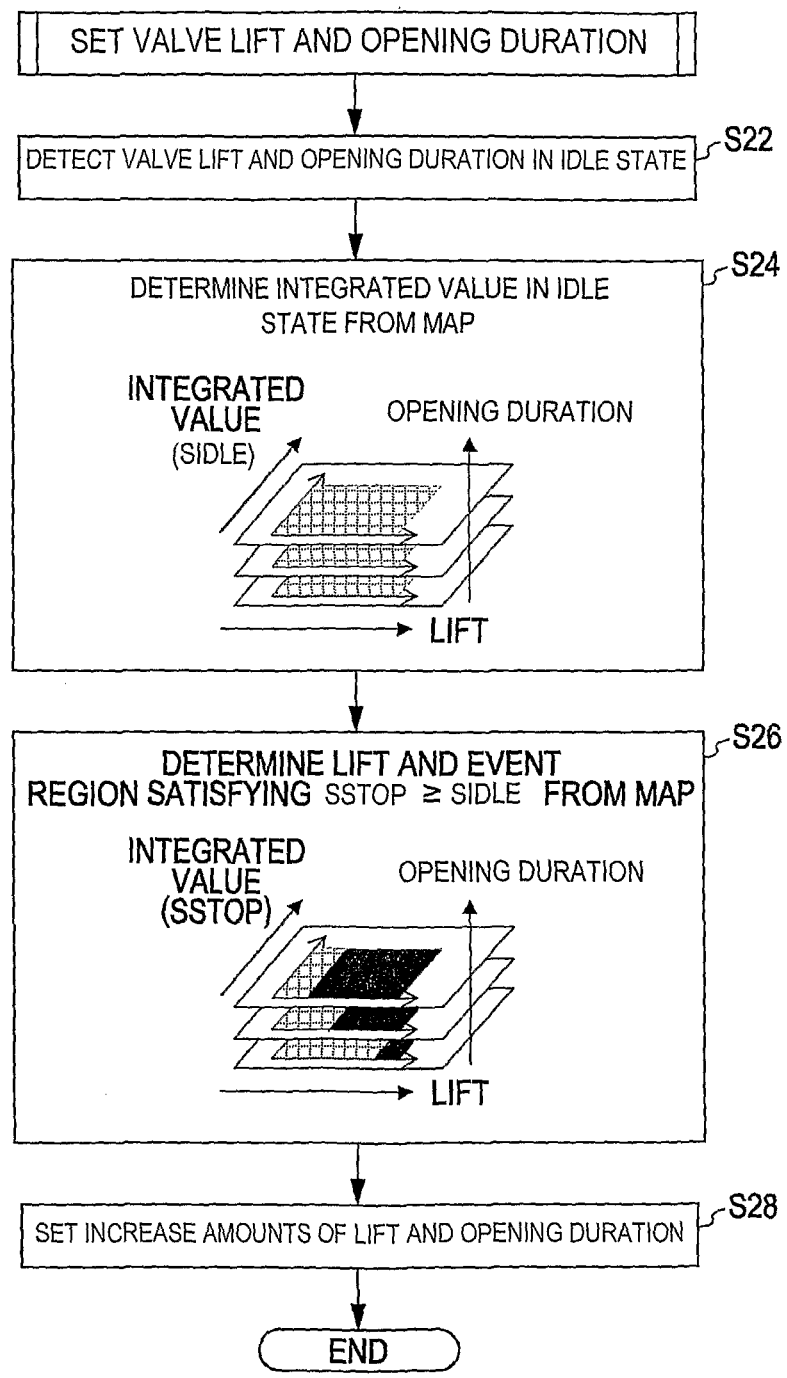
FIG. 10 is an example flowchart for a process of integrating valve lift at every very small crank angle increments according to an embodiment of the present invention.

In step S2', control of moving the intake valve 54 in the retard direction is started. In the control of increasing the valve opening, a necessary valve opening increase amount or a necessary valve opening increase period is set to a desired value. FIG. 10 is a flowchart for setting an increase amount of the valve opening duration or the valve lift when the variable valve mechanism 10 capable of changing the valve opening duration or the valve lift is employed. In step S22, the valve lift and the valve opening duration in the idle state are detected. In step S24, an integrated valve opening value in the idle state (SIDLE) of the valve lift is calculated at very small crank angle increments in the valve lift profile. As indicated in step S24, the SIDLE value can be obtained from a map previously obtained through an experiment or the like correlating valve lift, valve opening duration, and integrated valve opening value. Then, in step S26, an integrated valve opening value desired in a stop state (SSTOP) is obtained based a predetermined valve lift and a predetermined valve opening such that the integrated valve opening value in the stop state (SSTOP) is equal to or larger than the integrated valve opening value in the idle state (SIDLE) such that each of the valve lift and valve opening duration are larger in the stop state than in the idle state. On the basis of the valve lift and the valve opening duration satisfying the above condition in step S26, a valve lift and a valve opening are set to be increased in step S28.

At this time, by setting a minimum valve lift and a minimum valve opening duration, the valve opening increase amount and the valve opening increase period can be reduced.

Alternatively, the valve opening increase amount and the valve opening increase period can be set as follows.

For example, when the engine stop command is generated, and when the engine speed is relatively high, the hydraulic pressure supplied by the oil pump of the variable phase angle mechanism 20 is higher than the hydraulic pressure when the engine speed is low. Hence, the driving force in the retard direction is large. Thus, the necessary valve opening increase amount or the necessary valve opening increase period may be decreased as the engine speed when the engine stop command is generated is higher. In other words, at least one of the predetermined period and the integrated valve opening value can be set according to the engine speed at the time the engine stop command is generated such that when the engine speed at the time the engine stop command is generated is higher, at least one of the predetermine period and the integrated valve opening value is set to be lower.

Also, the moving amount of the intake valve 54 to the most retarded position is smaller as the phase angle difference between the valve opening center phase angle and the phase angle at the most retarded position of the intake valve 54 is smaller. Thus, the necessary valve opening increase amount or the necessary valve opening increase period may be decreased as the phase angle difference between the valve opening center phase angle of the intake valve 54 when the engine stop command is generated and the phase angle at the most retarded position is smaller. In other words, at least one of the predetermined period and the integrated valve opening value can be set according to a phase angle difference between a valve opening center phase angle when the engine stop command is generated and the valve opening center phase angle to be set in the startup operation such that when the phase angle difference is larger, at least one of the predetermined period is higher and the integrated valve opening value is set to be higher.

Further, the variable phase angle mechanism 20 is more difficult to move to the most retarded position as a lubricant temperature or a cooling water temperature of the engine is lower, the lubricant temperature and the cooling water temperature being correlated to the engine temperature. Thus, the necessary valve opening increase amount or the necessary valve opening increase period may be increased as the lubricant temperature or the cooling water temperature of the engine is lower (i.e., as the engine temperature is lower).

Accordingly, the necessary valve opening increase amount or the necessary valve opening increase period may be determined on the basis of a combination of a plurality of elements including the engine speed when the engine stop command is generated, the valve opening center phase angle of the intake valve 54, the lubricant temperature, and the cooling water temperature. In particular, a sensor can be configured to detect or estimate a engine operating parameter of the internal combustion engine, wherein the controller sets the predetermined period according to the engine operating parameter. When the engine operating parameter is an engine speed or an engine temperature when the engine stop command is generated, the predetermined period is set inversely with respect to the engine operating parameter such that as the engine operating parameter is lower, the predetermined period is longer. When the engine operating parameter is a phase angle difference between a valve opening center phase angle when the engine stop command is generated and a valve opening center phase angle to be set in the startup operation, the predetermined period is set directly with respect to the engine operating parameter such that as the engine operating parameter is higher, the predetermined period is longer.

In step S6', it is determined whether or not the current valve opening increase amount or the current valve opening increase period meets the value of the necessary valve opening increase amount or the necessary valve opening increase period, respectively. When the valve opening increase amount or the valve opening increase period meets the necessary respective value, the valve opening center phase angle is set, and the process goes to step S7, in which the control of increasing the valve opening is stopped.

With this configuration, the valve opening increase amount or the valve opening increase period of the intake valve 54 can be minimized.

Figure 8A:
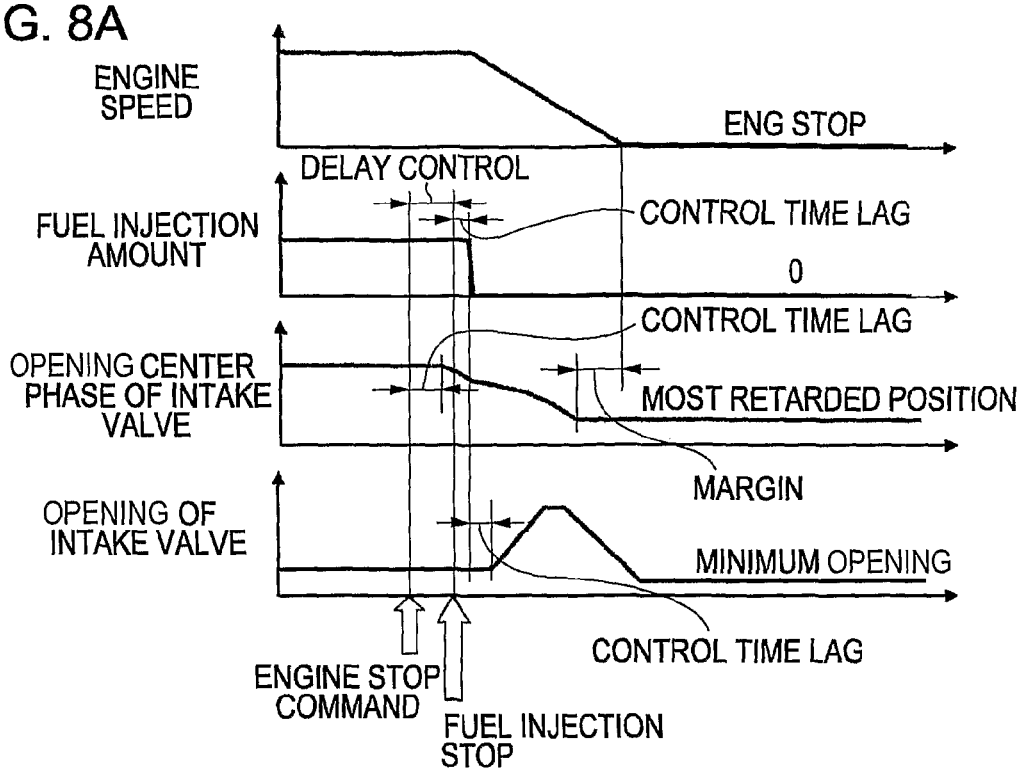
FIGS. 8A and 8B are time charts each showing changes in various engine operating parameters according to the second embodiment in comparison with the related art.
Figure 8B:
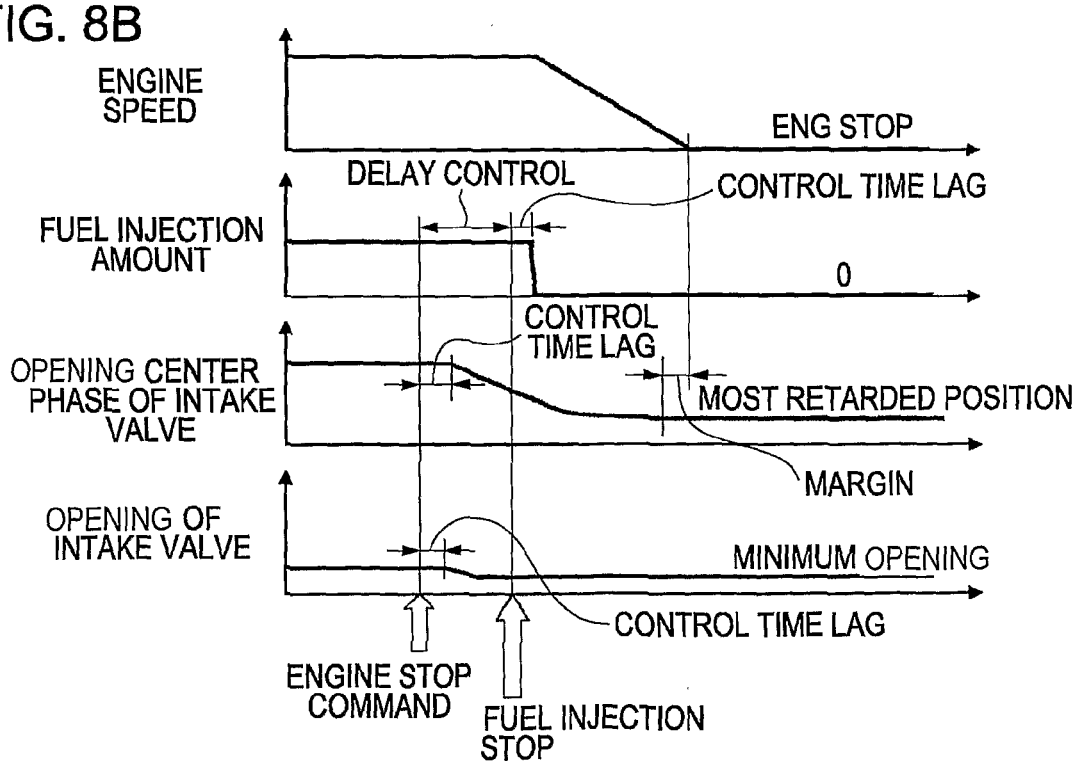

Also, in the above-described embodiments, the fuel injection is stopped immediately after the engine stop command is generated, and then the valve opening of the intake valve 54 is increased. However, the engine stop operation, including the stopping of fuel injection, may be delayed for a predetermined period, and then the valve opening of the intake valve 54 may be increased. In this case, the variable phase angle mechanism 20 controls the intake valve to be retarded by a certain amount, and then controls the intake valve to move to the most retarded position by increasing the valve opening. FIG. 8A illustrates changes in various engine operating parameters according to an embodiment having such a configuration in comparison with that according to the prior art in FIG. 8B.

In this embodiment, the delay time of the engine operation can be decreased as compared with the delay time of the prior art. Accordingly, the fuel consumption and the uncomfortable feeling of the driver can be reduced.

Also, the delay time of the engine operation in this embodiment may be set on the basis of the engine speed $N_e$ when the engine stop command is generated, the valve opening center phase angle of the intake valve 54, the lubricant temperature, or the cooling water temperature described in the second embodiment. In particular, when the engine speed at the generation of the engine stop command is high, when the phase angle difference between the valve opening center phase angle and the phase angle at the most retarded position of the intake valve 54 is small, and when the lubricant temperature or the cooling water temperature is high, the retardation of the variable phase angle mechanism 20 can be relatively smoothly performed, thereby further reducing the delay time. In contrast, when the engine speed at the generation of the engine stop command is low, when the phase angle difference between the valve opening center phase angle and the phase angle at the most retarded position of the intake valve 54 is large, and when the lubricant temperature or the cooling water temperature is low, the delay time may be increased.

In the above-described embodiments, the configuration is described, in which the valve opening center phase angle of the intake valve for the startup operation is set to the most retarded position. Alternatively, the present invention may be applied to an engine including an intake valve whose valve opening center phase angle for a startup operation is located at a predetermined position which is not the most retarded position, and is located at a retarded position with respect to a normal position in a normal operation. When a valve timing such that an overlap actively occurs at startup is selected to increase an exhaust gas temperature by guiding uncombusted gas back into the combustion chamber, the valve opening center phase angle for a startup operation of an exhaust valve may be set to a retarded position. In such an internal combustion engine, the present invention may be applied to the exhaust valve.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

What is claimed is:

1. A valve control apparatus for an internal combustion engine, the apparatus comprising:
   a variable phase angle mechanism configured to continuously change a valve opening phase angle of a valve, the variable phase angle mechanism being configured to set the valve opening phase angle at a retarded phase angle in a startup operation as compared with a normal phase angle in a normal operation;
   a variable valve mechanism configured to continuously change at least one of a valve opening duration and a valve lift of the valve, the variable valve mechanism cooperatively engaging the variable phase angle mechanism such that an increase in one or both of the valve opening duration and the valve lift of the valve increases the driving force on the variable phase angle mechanism in the retard direction; and
   a controller configured to control the variable phase angle mechanism and the variable valve mechanism;
   wherein the controller is programmed to control the variable valve mechanism, after an engine stop command is generated, such that an integrated valve opening value is increased to be larger than an idle state integrated valve opening value in an idle state and larger than a stop state integrated valve opening value in a stop state, thereby increasing the driving force on the variable phase angle mechanism in the retard direction.

2. The valve control apparatus according to claim 1, wherein the controller starts controlling the variable valve mechanism such that the integrated valve opening value is increased to be larger than the idle state integrated valve opening value only after the engine stop command is generated and after an engine stop operation is completed.

3. The valve control apparatus according to claim 1, wherein the controller controls the variable valve mechanism such that after the integrated valve opening value is increased to be larger than the idle state integrated valve opening value, the integrated valve opening value is then decreased.

4. The valve control apparatus according to claim 1, the apparatus further comprising:
a sensor configured to detect or estimate an engine speed;
wherein the controller controls the variable valve mechanism such that the integrated valve opening value is increased to be larger than the idle state integrated valve opening value for a predetermined period; and
wherein at least one of the predetermined period and the integrated valve opening value is set according to the engine speed at the time the engine stop command is generated such that when the engine speed at the time the engine stop command is generated is higher, at least one of the predetermine period and the integrated valve opening value is set to be lower.

5. The valve control apparatus according to claim 1, wherein the controller controls the variable valve mechanism such that the integrated valve opening value is increased to be larger than the idle state integrated valve opening value for a predetermined period; and
wherein at least one of the predetermined period and the integrated valve opening value is set according to a phase angle difference between a valve opening center phase angle when the engine stop command is generated and the valve opening center phase angle to be set in the startup operation such that when the phase angle difference is larger, at least one of the predetermined period and the integrated valve opening value is set to be higher.

6. The valve control apparatus according to claim 1, the apparatus further comprising:
a sensor configured to detect or estimate an engine temperature;
wherein the controller controls the variable valve mechanism such that the integrated valve opening value is increased to be larger than the idle state integrated valve opening value for a predetermined period; and
wherein at least one of the predetermined period is increased and the integrated valve opening value is set according to a temperature of the engine such that when the engine temperature is lower, at least one of the predetermined period and the integrated valve opening value is set to be higher.

7. The valve control apparatus according to claim 1, wherein the controller controls fuel injection to the engine and delays stopping of fuel injection for a predetermined period after the engine stop command is generated.

8. The valve control apparatus according to claim 7, the apparatus further comprising:
a sensor configured to detect or estimate an engine operating parameter of the engine;
wherein the controller sets the predetermined period according to the engine operating parameter;
wherein when the engine operating parameter is an engine speed or an engine temperature when the engine stop command is generated, the predetermined period is set inversely with respect to the engine operating parameter such that as the engine operating parameter is lower, the predetermined period is longer; and
wherein when the engine operating parameter is a phase angle difference between a valve opening center phase angle when the engine stop command is generated and a valve opening center phase angle to be set in the startup operation, the predetermined period is set directly with respect to the engine operating parameter such that as the engine operating parameter is higher, the predetermined period is longer.

9. The valve control apparatus according to claim 1, wherein the variable phase angle mechanism is hydraulically driven, and wherein the variable valve mechanism is electrically driven.

10. A valve control apparatus for an internal combustion engine, the apparatus comprising:
a variable phase angle mechanism configured to continuously change a valve opening phase angle of a valve, the variable phase angle mechanism being configured to set the valve opening phase angle at a retarded phase angle in a startup operation as compared with a normal phase angle in a normal operation;
a variable valve mechanism configured to continuously change at least one of a valve opening duration and a valve lift of the valve, the variable valve mechanism cooperatively engaging the variable phase angle mechanism such that an increase in one or both of the valve opening duration and the valve lift of the valve increases the driving force on the variable phase angle mechanism in the retard direction; and
a controller configured to control the variable phase angle mechanism and the variable valve mechanism;
wherein the controller is programmed to control the variable valve mechanism during a predetermined period after an engine stop command is generated and prior to stopping of operation of the engine such that an integrated valve opening value is increased to be larger than a startup operation integrated valve opening value for a startup operation and larger than a stop state integrated valve opening value in a stop state, thereby increasing the driving force on the variable phase angle mechanism in the retard direction, and then controls the variable valve mechanism such that the integrated valve opening value is restored to the startup operation integrated valve opening value.

11. A valve control apparatus for an internal combustion engine, the apparatus comprising:
a variable phase angle mechanism configured to continuously change a valve opening phase angle of a valve, the variable phase angle mechanism being configured to set the valve opening phase angle at a retarded phase angle in a startup operation as compared with a normal phase angle in a normal operation;
a variable valve mechanism configured to continuously change at least one of a valve opening duration and a valve lift of the valve, the variable valve mechanism cooperatively engaging the variable phase angle mechanism such that an increase in one or both of the valve opening duration and the valve lift of the valve increases the driving force on the variable phase angle mechanism in the retard direction; and
a controller configured to control the variable phase angle mechanism and the variable valve mechanism,
wherein the controller is programmed to control the variable valve mechanism during a predetermined period after an engine stop command is generated and prior to stopping of operation of the engine such that at least one of the valve opening duration and the valve lift of the valve is increased to be larger than a respective valve opening and valve lift of the valve in an idle state and larger than a stop state integrated valve opening value in a stop state, thereby increasing the driving force on the variable phase angle mechanism in the retard direction, and then controls the variable valve mechanism for the startup operation.

12. The valve control apparatus according to claim 11, wherein one of the valve opening duration and the valve lift of the valve is held fixed while the other of the valve opening duration and the valve lift of the valve is controlled by the controller during the predetermined period after an engine stop command is generated and prior to stopping of operation of the engine.

13. A method for controlling, a valve in an internal combustion engine having a variable phase angle mechanism configured to continuously change a valve opening phase angle of the valve and a variable valve mechanism configured to continuously change at least one of a valve opening duration and a valve lift of the valve, the variable valve mechanism cooperatively engaging the variable phase angle mechanism such that an increase in one or both of the valve opening duration and the valve lift of the valve increases the driving force on the variable phase angle mechanism in the retard direction, the method comprising:
  determining an idle state integrated valve opening value by integrating the area under a curve plotting the valve lift of the valve on the vertical axis and the valve opening duration of the valve on the horizontal axis when the engine is operating in an idle state; and
  after an engine stop command is generated, determining a current integrated valve opening value by integrating the area under a curve plotting the valve lift of the valve on the vertical axis and the valve opening duration of the valve on the horizontal axis, and controlling at least one of the valve lift and the valve opening duration of the valve such that the current integrated value is increased to be larger than the idle state integrated valve opening value and larger than a stop state integrated valve opening value in a stop state, thereby increasing the driving force on the variable phase angle mechanism in the retard direction.

14. The method according to claim 13, wherein the step of controlling at least one of the valve lift and the valve opening duration starts only after the engine stop command is generated and after an engine stop operation is completed.

15. The method according to claim 13, further comprising:
  after the step of controlling the at least one of the valve lift and the valve opening duration of the valve such that the current integrated value is increased to be larger than the idle state integrated valve opening value, controlling the at least one of the valve lift and the valve opening duration of the valve such that the current integrated value is decreased.

16. The method according to claim 13, further comprising:
  detecting or estimating an engine speed;
  maintaining the integrated valve opening value to be larger than the idle state integrated valve opening value for a predetermined period; and
  setting at least one of the predetermined period and the integrated valve opening value according to the engine speed at the time the engine stop command is generated such that when the engine speed at the time the engine stop command is generated is higher, at least one of the predetermine period and the integrated valve opening value is set to be lower.

17. The method according to claim 13, further comprising:
  determining a phase angle difference between a valve opening center phase angle to be set in a startup operation and a valve opening center phase angle when the engine stop command is generated;
  maintaining the integrated valve opening value to be larger than the idle state integrated valve opening value for a predetermined period; and
  setting at least one of the predetermined period and the integrated valve opening value according to the phase angle difference such that when the phase angle difference is larger, at least one of the predetermined period and the integrated valve opening value is set to be higher.

18. The method according to claim 13, further comprising:
  detecting or estimating an engine temperature;
  maintaining the integrated valve opening value to be larger than the idle state integrated valve opening value for a predetermined period; and
  setting at least one of the predetermined period and the integrated valve opening value according to a temperature of the engine such that when the engine temperature is lower, at least one of the predetermined period and the integrated valve opening value is set to be higher.

19. The method according to claim 13, further comprising:
  after the engine stop command is generated, delaying stopping of fuel injection to the engine for a predetermined period;
  detecting or estimating an engine operating parameter of the engine; and
  setting the predetermined period according to the engine operating parameter;
  wherein when the engine operating parameter is an engine speed or an engine temperature when the engine stop command is generated, the predetermined period is set inversely with respect to the engine operating parameter such that as the engine operating parameter is lower, the predetermined period is longer; and
  wherein when the engine operating parameter is a phase angle difference between a valve opening center phase angle when the engine stop command is generated and a valve opening center phase angle to be set in the startup operation, the predetermined period is set directly with respect to the engine operating parameter such that as the engine operating parameter is higher, the predetermined period is longer.

20. A valve control apparatus for an internal combustion engine, the apparatus comprising:
  variable phase angle means configured to continuously change a valve opening phase angle of a valve, the variable phase angle means being configured to set the valve opening phase angle at a retarded phase angle in a startup operation as compared with a normal phase angle in a normal operation;
  variable valve means-configured to continuously change at least one of a valve opening duration and a valve lift of the valve, the variable valve means cooperatively engaging the variable phase angle means such that an increase in one or both of the valve opening duration and the valve lift of the valve increases the driving force on the variable phase angle mechanism in the retard direction; and
  control means configured to control the variable phase angle means and the variable valve means;
  wherein the control means is programmed to cause the variable valve means to, after an engine stop command is generated, change at least one of the valve opening duration and the valve lift of the valve to increase an integrated valve opening value to be increased to be larger than an idle state integrated valve opening value in an idle state and larger than a stop state integrated valve opening value in a stop state, thereby increasing the driving force on the variable phase angle means in the retard direction.

* * * * *